United States Patent [19]

Prevorsek et al.

[11] Patent Number: 5,187,023
[45] Date of Patent: Feb. 16, 1993

[54] BALLISTIC RESISTANT FABRIC ARTICLES

[75] Inventors: Dusan C. Prevorsek; Gary A. Harpell, both of Morristown, N.J.

[73] Assignee: Allied-Signal Inc., Morristown, N.J.

[21] Appl. No.: 615,746

[22] Filed: Nov. 19, 1990

[51] Int. Cl.⁵ ............................................. F41H 1/02
[52] U.S. Cl. ..................... 428/911; 428/256
[58] Field of Search ............... 428/911, 2556; 89/36.02; 2/2.5

[56] References Cited

U.S. PATENT DOCUMENTS 4,660,223 4/1987 Fritz .................................. 428/911
4,911,061 3/1990 Pluitt et al. ....................... 428/911
4,923,728 5/1990 Snedeker ........................... 428/911

Primary Examiner—Patrick J. Ryan
Assistant Examiner—Richard Weisberger
Attorney, Agent, or Firm—R. C. Stewart, II; G. H. Fuchs; D. L. Webster

[57] ABSTRACT

A flexible article of manufacture especially suitable for use as a ballistic resistant body armor which comprises at least one substrate, said layers being a fibrous layer, and at least one layer having a plurality of metallic bodies sewn to at least one surface of said substrate layer.

37 Claims, 6 Drawing Sheets

BALLISTIC RESISTANT FABRIC ARTICLES

BACKGROUND OF THE INVENTION

1. Field of the Invention

This invention relates to ballistic resistant fabric articles. More particularly, this invention relates to flexible ballistic resistant articles having improved ballistic protection.

2. Prior Art

Ballistic articles such as bulletproof vests, helmets, structural members of helicopters and other military equipment, vehicle panels, briefcases, raincoats and umbrellas containing high strength fibers are known. Fibers conventionally used include aramid fibers such as poly(phenylenediamine terephthalamide), graphite fibers, nylon fibers, ceramic fibers, glass fibers and the like. For many applications, such as vests or parts of vests, the fibers are used in a woven or knitted fabric. For many of the applications, the fibers are encapsulated or embedded in a matrix material.

U.S. Pat. Nos. 4,623,574 and 4,748,064 disclose a simple composite structure comprising high strength fibers embedded in an elastomeric matrix. The simple composite structure exhibits outstanding ballistic protection as compared to simple composites utilizing rigid matrices, the results of which are disclosed in the patents. Particularly effective are simple composites employing ultra-high molecular weight polyethylene and polypropylene such as disclosed in U.S. Pat. No. 4,413,110.

U.S. Pat. Nos. 4,737,402 and 4,613,535 disclose complex rigid composite articles having improved impact resistance which comprise a network of high strength fibers such as the ultra-high molecular weight polyethylene and polypropylene disclosed in U.S. Pat. No. 4,413,110 embedded in an elastomeric matrix material and at least one additional rigid layer on a major surface of the fibers in the matrix. It is disclosed that the composites have improved resistance to environmental hazards, improved impact resistance and are unexpectedly effective as ballistic resistant articles such as armor.

U.S. Pat. No. 4,650,710 discloses a flexible article of manufacture comprising a plurality of first flexible layers arranged in a first portion of the article, each of said first layers consisting essentially of fibers having a tensile modulus of at least about 300 g/denier and a tenacity of at least about 15 g/denier and a tenacity of at least about 15 g/denier and a plurality of a second flexible layers arranged in a second portion of said article, each of said second flexible layers comprising fibers, the resistance to displacement of fibers in each of said second flexible layers being greater than the resistance to displacement in each of said first flexible layers.

Other ballistic resistant articles are described in U.S. Pat. Nos. 4,916,000; 4,403,012, 4,457,985; 4,737,401; 4,543,286; 4,563,392 and 4,501,856.

SUMMARY OF THE INVENTION

The present invention provides a flexible article of manufacture comprising at least one flexible substrate having a plurality of planar metallic bodies affixed to all or a portion of a major surface of said substrate layer.

Several advantages flow from this invention. For example, the article of this invention exhibits relatively improved penetration resistance as compared to fibrous articles of the same areal density without unduly affecting the flexibility of the article adversely. Moreover, for the article of this invention minimal loss in puncture resistance when wet as compared to conventional puncture resistant fibers. Through use of this invention, relatively higher denier yarn can be employed in the manufacture in the articles of this invention without unduly affecting the penetration resistance of the article. The articles of this invention provide a higher degree of penetration resistance than articles of the same areal density constructed solely of the substrate material such as a fabric.

BRIEF DESCRIPTION OF THE DRAWINGS

The invention will be more fully understood and further advantages will become apparent when reference is made to the following detailed description of the invention and the accompanying drawings in which.

DETAILED DESCRIPTION OF THE PREFERRED EMBODIMENTS OF THE INVENTION

The preferred invention will be better understood by those of skill in the art by reference to the above figures. The preferred embodiments of this invention illustrated in the figures are not intended to be exhaustive or to limit the invention to the precise form disclosed. It is chosen to describe or to best explain the principles of the invention and its application and practical use to thereby enable others skilled in the art to best utilize the invention.

In its broadest aspects, the invention is directed to a multilayered article of manufacture comprising at least one flexible substrate having a plurality of metal bodies affixed to a surface thereof. The article of this invention exhibits improved penetration resistance when said article is impacted by a projectile without adversely affecting the flexibility of the article to an undue extent.

As used herein, the "penetration resistance" of the article is the resistance to penetration by a designated threat, as for example, a bullet, an ice pick, a knife or the like. The penetration resistance can be expressed as the ratio of peak force (F) for designated threat (projectile, velocity, and other threat parameters known to those of skill in the art to affect peak force) divided by the areal density (ADT) of the target. As used herein, the "peak force", is the maximum force exerted by a threat to penetrate a designated target using a model 1331 high speed Instron Tester having an impact velocity of about 12ft/sec (3.66 m/sec) and where the target strike face area has a diameter of 3 in.(7.6 cm) (See the Examples); and as used herein, the "areal density" or "ADT" is the ratio of total target weight to the area of the target strike face.

The flexibility of the articles of the present invention can be demonstrated by clamping a 30 cm square sample of the article horizontally along one side edge with an overhang of 20 cm, and measuring the amount of drape of the article (the amount of drape being measured by the distance between the level of the clamped side edge and the opposite edge). For flexible articles of this invention, the amount of drape is ordinarily at least about 8 cm, preferably at least about 10 cm, more preferably at least about 13 cm and most preferably at least about 17 cm.

Figure 1:
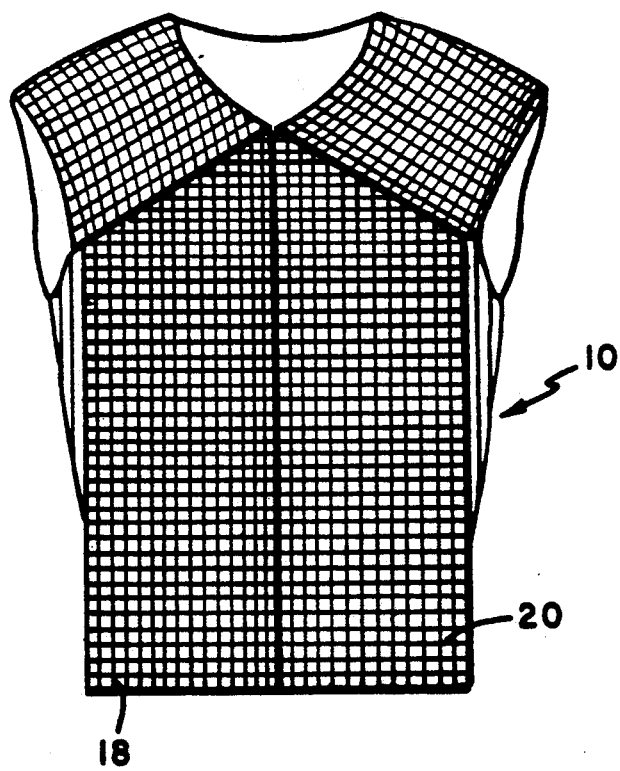
FIG. 1 is a front perspective view of a preferred embodiment of the article of this invention.
Figure 2:
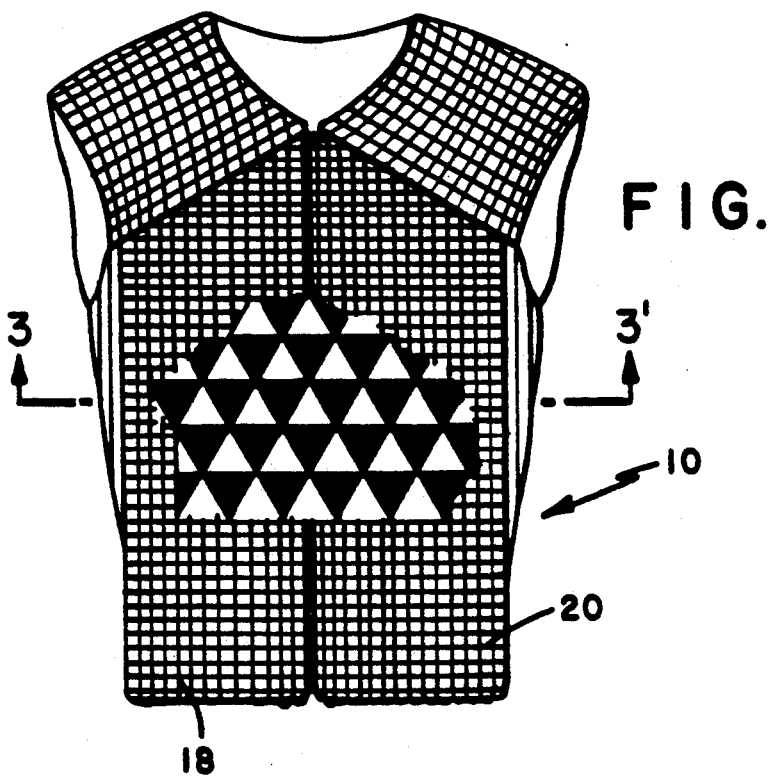
FIG. 2 is a front perspective view of the embodiment of FIG. 1 having certain selected components cut away for purpose of illustration.
Figure 3:
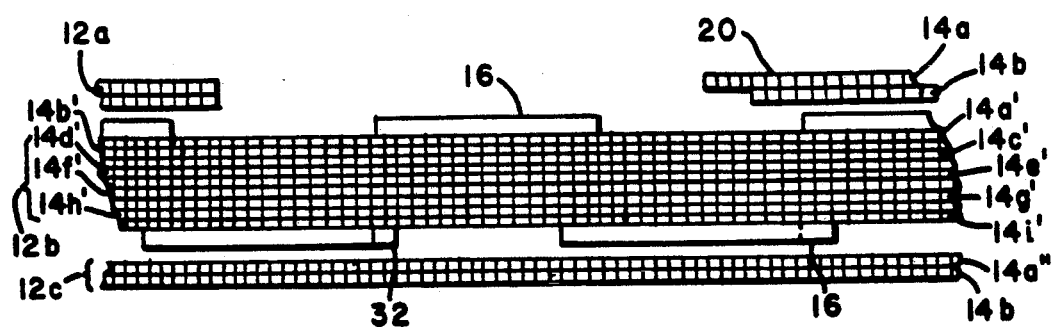
FIG. 3 is an enlarged fragmentary sectional view of the body armor of this invention of FIG. 3 taken on line 3—3 which includes a plurality of rigid ballistic resistant elements on outer surfaces of a plurality of fibrous layers.

Referring to FIGS. 1, 2 and 3, the numeral 10 indicates a ballistic resistant article 10, which in the preferred embodiments of the invention is ballistic resistant body armor. As depicted in FIG. 2, article 10 is comprised of one or more composite layers 12. At least one layer 12 comprises one or more substrate layers 14. As depicted in FIG. 2, article 10 is comprised of three layers 12a to 12c. Layers 12a includes two layers 14a and 14b, layer 12b includes nine layers 14a' and 14' and layer 12c includes two layers 14 a'' and 14b''. However, the number of layers 12 and substrate layers 14 included in article 10 may vary widely, provided that at least two layers are present. In general, the number of layers in any embodiment will vary depending on the degree of penetration resistance and flexibility desired. The number layers 12 and substrate layers 14 is preferably from 2 to about 70, more preferably from about 5 to about 60 and most preferably from about 20 to about 50.

As shown in FIGS. 1, 2, 3 and 4 substrate layers 14 are forming the various secured together by horizontal securing means 18 and vertical securing means 20. In the illustrative embodiments of the invention depicted in the figures is stitching; however, any conventional securing means may be used including but not limited to bolts, rivets, adhesive, staples, stitches, and the like. While in the embodiment of the figures all substrate layers 14 forming a fibrous layers 12 are secured together, it is contemplated that the number of layers 14 secured together may be as few as two, or any number of layers 14 in article 10 in any combination. In the preferred embodiments of the invention where the number of layers 14 is more than about 20, all the layers are not secured together. In these embodiments, from about 2 to about 20 layers preferably from 2 to about 12 layers, more preferably from about 2 to about 10 layers and most preferably from about 2 to about 8 are secured together forming a plurality of packets (not depicted). These packets forming various fibrous layers 12 may in turn be secured together by a conventional securing means as described above.

In the preferred embodiments of the invention depicted in FIGS. 1 and 2, stitches 18 and 20 are utilized to secure substrate layers 12. The type of stitching employed may vary widely. Stitching and sewing methods such as lock stitching, chain stitching, zig-zag stitching and the like are illustrative of the type of stitching for use in this invention. An important feature of this invention is the tensile properties of the fiber used in stitching means 14 and 16. It has been found that a relatively high modulus (equal to or greater than about 200 grams/denier) and a relatively high tenacity (equal to or greater than about 5 grams/denier) fiber is essential for the beneficial effects of the invention. All tensile properties are evaluated by pulling a 10 in (25.4 cm) fiber length clamped in barrel clamps at a rate of 10 in/min (25.4 cm/min) on an Instron Tensile Tester. In the preferred embodiments of the invention, the tensile modulus is from about 400 to about 3000 grams/denier and the tenacity is from about 20 to about 50 grams/denier, more preferably the tensile modulus is from about 1000 to about 3000 grams/denier and the tenacity is from about 25 to about 50 grams/denier and most preferably the tensile modulus is from about 1500 to about 3000 grams/denier and the tenacity is from about 30 to about 50 grams/denier.

Useful threads and fibers may vary widely and will be described in more detail herein below in the discussion of fiber for use in the fabrication of fibrous layers 12. However, the thread or fiber used in stitching means 14 and 16 is preferably an aramid fiber or thread (as for example Kevlar ® 29, 49, 129 and 149 aramid fibers), an extended chain polyethylene thread or fiber (as for example Spectra ® 900 and Spectra ® 1000 polyethylene fibers) or a mixture thereof.

The areal density of substrate layer(s) 14 may vary widely. In general, for ballistic body armor applications, the areal density is equal to or less than about 12 kg/m$^2$. In the preferred embodiments of the invention, the areal density is equal to or less than about 7 kg/m$^2$, and in the more preferred embodiments of the invention, the areal density is from about 3 to about 6.5 kg/m$^2$. In the most preferred embodiments of the invention, the areal density is from about 3.5 to about 6.2 kg/m$^2$.

Substrate layer 14 may vary widely, the only requirement is that it be flexible as defined above. For example, substrate layer 14 may be a flexible polymer or elastomeric film formed from a thermoplastic or elastomeric resin. Such thermoplastic and elastomeric resins for use in the practice of this invention may vary widely. Illustrative of useful thermoplastic resins are polylactones such as poly(pivalolactone), poly((-caprolactone) and the like; polyurethanes derived from reaction of diisocyanates such as 1,5-naphalene diisocyanate, p-phenylene diisocyanate, m-phenylene diisocyanate, 2,4-toluene diisocyanate, 4'4'diphenylmethane diisocyanate, 3-3'-dimethyl-4,4' diphenylisopropylidiene diisocyanate, 3,3'-dimethyl-4,4' diphenyl diisocyanate, 3,3'-dimethyl-4,4'-dephenylmethane diisocyanate, 3,3'-dimethyoxy-4,4'biphenyl diisocyanate, dianisidine diisocyanate, tolidine diisocyante, hexamethylene diisocyanate, 4,4'diisocyananodiphenylemthane and the like and linear long-chain diols such as poly(tetramethylene adipate), poly(ethylene adipate), poly(1,4-butylene adipate), poly(ethylene adipate), polyether diols and the like; polycarbonates such as poly[1,1-ether bis(4-phenly carbonte], poly[1,1-ether bis(4-phenyl) carbonate], poly[diphenylmethane bis (4-phenyl) carbonat], poly[1,1-cyclohexane bis (4-phenyl) carbonate], poly[1,1-cyclohexane bis(4-phenyl carbonate]and the like; poly sulfones; polyether ether ketones; polymides such as poly(4-amino butyric acid), poly(hexamethylene adipamide), poly(6-aminohexanoic aicd), poly(m-xylylene adipamide), poly(p-xylylene sebacamide), poly 2,2,2-trimethyl hexamethylene terephthalamide), poly(metaphenyleneisophthalamide) (Nomex®), poly(p-phenylene terephthalamide) (Kevlar®), and the like; polyesters such as poly(ethylene azelate), poly(ethylene-1,5-naphthalate), poly(ethylene oxybenzoate) (A-Tell), poly(ethylene oxybienzoate) (A-Tell), poly(parahydroxy benzoate) (Ekonol), poly(1,4-cyclohexylidene dimethylene terephthalate) (Kodel)(as), poly(1,4-cyclohexylidene dimethylene terephthalate) (Kodel)(trans), polyethylene terephthalate terephthalate and the like; poly(arylene oxides) such as poly(2,6-diphenyl-1,4-phenylene oxide), poly(2,6-diphenyl-1,4-phenylene oxide) and the like; poly(arylene sulfides) such as poly(phenylene sulfide) and the like; polyetherimides; thermoplastic elastomers such as polyurethane elastomers, fluoroelastomers, butadiene/acrylonitrule elastomers, block copolymers, made up of segmetns of glassy or crystalline blocks such as polystyrene, poly(vinyl-toluene), poly(t-butyl styrene), polyester and the like and the elastomeric blocks such as polybutadiene, polyisoprene, ethylene-propylene copolymers, ethylene-butylene copolymers, polyether ester and the like as for example the copolymers in polystyrene-polybutadienepolystrene block copolymer manufactured by Shell Chemical Company under the trade name of Kraton®; vinyl polymer and their copolymers such as polyvinyl acetate, polyvinyl alcohol, polyvinyl chloride, polyvinyl butyral, polyvinyl-idene chloride, ethylene-vinyl acetate copolymers, and the like; polyacrylics, polyacrylate and their copolymers such as polyethyl acrylate, poly(n-butyl afrylate), polymethyl methacrylate, polyethyl methacrylate, poly(n-butyl methacrylate), polyacryl-amide, polyacrylonitrile, polyacrylic acid, ethylene-acrylic acid copolymers, methyl methacrylate-styrene copolymers, ethylene-ethyl acrylate copolymers, methacrylated butadiene-styrene copolymers and the like; polyolefins such as low density polyethylene, polyolefins such as low density polyethylene, polypropylene, chlorinated low desity polyethlene, poly(4-methyl-1-pentene) and the like; ionomers; and polyepichlorohydrins; polycarbonates and the like.

Substrate layer 14 may also comprise a network of fibers either alone or dispersed in a matrix. For purposes of the present invention, fiber is defined as an elongated body, the length dimension of which is much greater than the dimensions of width and thickness. Accordingly, the term fiber as used herein includes a monofilament elongated body, a multifilament elongated body, ribbon, strip, and the like having regular or irregular cross sections. The term fibers includes a plurality of any one or combination of the above.

The cross-section of fibers for use in this invention may vary widely. Useful fibers may have a circular cross-section, oblong cross-section or irregular or regular multi-lobal cross-section having one or more regular or irregular lobes projecting from the linear or longitudinal axis of the fibers. In the particularly preferred embodiments of the invention, the fibers are of substantially circular or oblong cross-section and in the most preferred embodiments are of circular or substantially circular cross-section.

Layer 14 may be formed from fibers alone, or from fibers coated with a suitable polymer, as for example, a polyolefin, polyamide, polyester, polydiene such as a polybutadiene, urethanes, diene/olefin copolymers, poly(styrene-butadienestyrene) block copolymers, and a wide variety of elastomers. Substrate layer 14 may also comprise a network of a fibers dispersed in a polymeric matrix as for example a matrix of one or more of the above referenced polymers to form a flexible composite as described in more detail in U.S. Pat. Nos. 4,623,574; 4,748,064; 4,916,000; 4,403,012; 4,457,985; 4,650,710; 4,681,792; 4,737,401 4,543,286; 4,563,392; and 4,501,856. Regardless of the construction, substrate layer 14 is such that article 10 has the required degree of flexibility.

The fibers in substrate layer 14 may be arranged in networks having various configurations. For example, a plurality of fibers can be grouped together to form twisted or untwisted yarn bundles in various alignments. The filaments or yarn may be formed as a felt, knitted or woven (plain, basket, satin and crow feet weaves, etc.) into a network, fabricated into non-woven fabric, arranged in parallel array, layered, or formed into a woven fabric by any of a variety of conventional techniques. Among these techniques, for ballistic resistance applications we prefer to use those variations commonly employed in the preparation of aramid fabrics for ballistic-resistant articles. For example, the techniques described in U.S. Pat. No. 4,181,768 and in M. R. Silyquist et al., *J. Machromol Sci. Chem.*, A7(1), pp. 203 et. seq. (1973) are particularly suitable.

The type of fibers used in the fabrication of substrate layer 14 may vary widely may be inorganic or organic fibers. Preferred fibers for use in the practice of this invention are those having a tenacity equal to or greater than about 10 grams/denier (g/d) (as measured by an Instron Tensile Testing machine), a tensile modulus equal to or greater than about 150 g/d (as measured by an Instron Tensile Testing machine) and an energy-to-break equal to or greater than about 8 joules/gram. Particularly preferred fibers are those having a tenacity equal to or greater than about 20 g/d, a tensile modulus equal to or greater than about 500 g/d and energy-to-break equal to or greater than about 30 joules/grams. Amongst these particularly preferred embodiments, most preferred are those embodiments in which the tenacity of the fibers is equal to or greater than about 25 g/d, the tensile modulus is equal to or greater than about 1000 g/d, and the energy-to-break is equal to or greater than about 35 joules/gram. In the practice of this invention, filaments of choice have a tenacity equal to or greater than about 30 g/d, the tensile modulus is equal to or greater than about 1300 g/d and the energy-to-break is equal to or greater than about 40 joules/gram.

The denier of the fiber may vary widely. In general, fiber denier is equal to or less than about 4000. In the preferred embodiments of the invention, fiber denier is from about 10 to about 4000, the more preferred embodiments of the invention fiber denier is from about 10 to about 1000 and in the most preferred embodiments of the invention, fiber denier is from about 10 to about 400. Useful inorganic fibers include S-glass fibers, E-glass fibers, carbon fibers, boron fibers, alumina fibers, zirconia-silica fibers, alumina-silica fibers and the like.

Illustrative of useful organic fibers are those composed of polyesters, polyolefins, polyetheramides, fluoropolymers, polyethers, celluloses, phenolics, polyesteramides, polyurethanes, epoxies, aminoplastics, polysulfones, polyetherketones, polyetheretherketones, polyesterimides, polyphenylene sulfides, polyether acryl ketones, poly(amideimides), and polyimides. Illustrative of other useful organic filaments are those composed of aramids (aromatic polyamides), such as poly(m-xylylene adipamide), poly(p-xylylene sebacamide), poly 2,2,2-trimethylhexamethylene terephthalamide), poly (piperazine sebacamide), poly (metaphenylene isophthalamide) (Nomex) and poly (p-phenylene terephthalamide) (Kevlar); aliphatic and cycloaliphatic polyamides, such as the copolyamide of 30% hexamethylene diammonium isophthalate and 70% hexamethylene diammonium adipate, the copolyamide of up to 30% bis-(-amidocyclohexyl)methylene, terephthalic acid and caprolactam, polyhexamethylene adipamide (nylon 66), poly(butyrolactam) (nylon 4), poly (9-aminonoanoic acid) (nylon 9), poly(enantholactam) (nylon 7), poly(capryllactam) (nylon 8), polycaprolactam (nylon 6), poly (p-phenylene terephthalamide), polyhexamethylene sebacamide (nylon 6, 10), polyaminoundecanamide (nylon 11), polydodeconolactam (nylon 12), polyhexamethylene isophthalamide, polyhexamethylene terephthalamide, polycaproamide, poly(nonamethylene azelamide) (nylon 9,9), poly(decamethylene azelamide) (nylon 10,9), poly(decamethylene sebacamide) (nylon 10,10), poly[bis-(4-aminocyclothexyl) methane 1,10-decanedicarboxamide](Qiana) (trans), or combination thereof; and aliphatic, cycloaliphatic and aromatic polyesters such as poly(1,4-cyclohexlidene dimethyl eneterephathalate) cis and trans, poly(ethylene-1, 5-naphthalate), poly(ethylene-2,6-naphthalate), poly(1, 4-cyclohexane dimethylene terephthalate) (trans), poly(decamethylene terephthalate), poly(ethylene terephthalate), poly(ethylene isophthalate), poly(ethylene oxybenozoate), poly(para-hydroxy benzoate), poly(-dimethylpropiolactone), poly(decamethylene adipate), poly(ethylene succinate), poly(ethylene azelate), poly(-decamethylene sebacate), poly(-dimethyl-propiolactone), and the like.

Also illustrative of useful organic fibers are those of liquid crystalline polymers such as lyotropic liquid crystalline polymers which include polypeptides such as poly-γ-benzyl L-glutamate and the like; aromatic polyamides such as poly(1,4-benzamide), poly(chloro-1,4-phenylene terephthalamide), poly(1,4-phenylene fumaramide), poly(chloro-1,4-phenylene fumaramide), poly(4,4'-benzanilide trans, trans-muconamide), poly(1,4-phenylene mesaconamide), poly(1,4-phenylene) (trans-1,4-cyclohexylene amide), poly(chloro-1,4-phenylene) (trans-1,4-cyclohexylene amide), poly(1,4-phenylene 1,4-dimethyl-trans-1,4-cyclohexylene amide), poly(1,4-phenylene 2,5-pyridine amide), poly(chloro-1,4-phenylene 2,5-pyridine amide), poly(3,3'-dimethyl-4,4'-biphenylene 2.5 pyridine amide), poly(1,4-phenylene 4,4'-stilbene amide), poly(chloro-1,4-phenylene 4,4'-stilbene amide), poly(1,4-phenylene 4,4'-azobenzene amide), poly(4,4'-azobenzene 4,4'-azobenzene amide), poly(1,4-phenylene 4,4'-azoxybenzene amide), poly(4,4'-azobenzene 4,4'-azoxybenzene amide), poly(1,4-cyclohexylene 4,4'-azobenzene amide), poly(4,4'-azocyclohexylene 4,4'-azobenzene amide), poly(4,4'-azobenzene terephthal amide), poly(3.8-phenanthridinone terephthal amide), poly(4,4'-biphenylene terephthal amide), poly(4,4-biphenylene 4,4'-bibenzo amide), poly(1,4-phenylene 4,4'-bibenzo amide), poly(1,4-phenylene 4,4'-terephenylene amide), poly(1,4-phenylene 2,6-naphthal amide), poly(1,5-naphthylene terephthal amide), poly(3,3'-dimethyl-4,4-biphenylene terephthal amide), poly(3,3'-dimethoxy-4,4'-biphenylene terephthal amide), poly(3,3'-dimethoxy-4, 4-biphenylene 4,4'-bibenzo amide) and the like; polyoxamide such as those derived from 2,2'dimethyl-4,4'diamino biphenyl and chloro-1,4-phenylene diamine; polyhydrazides such as poly chloroterephthalic hydrazide, 2,5-pyridine dicarboxylic acid hydrazide) poly(terephthalic hydrazide), poly(terephthalic- chloroterephthalic hydrazide) and the like; poly(amide-hydrazides) such as poly(terephthaloyl 1,4 amino-benzhydrazide) and those prepared from 4-amino-benzhydrazide, oxalic dihydrazide, terephthalic dihydrazide and para-aromatic diacid chlorides; polyesters such as those of the compositions include poly(oxy-trans-1, 4-cyclohexyleneoxycarbonyl-trans-1,4-cyclohexylenecarbonyl-β-oxy-1,4-phenyleneoxyterephthaloyl) and poly(oxy-cis-1,4-cyclohexyleneoxycarbonyl-trans-1,4-cyclohexylenecarbonyl-β-oxy-1,4-phenyleneoxyterephthaloyl) in methylene chloride-o-cresol poly[(oxy-trans-1,4-cyclohexyleneoxycarbonyl-trans-1,4-cyclohexylenecarbonyl-β-oxy-(2-methyl-yl-1,4-phenylene)oxy-terephthaloyl)] in 1,1,2,2-tetrachloro-ethane-o-chlorophenol-phenol (60:25:15 vol/vol/vol), poly[oxy-trans-1,4-cyclohexyleneoxycarbonyl-trans-1,4-cyclohexylenecarbonyl-β-oxy(2-methyl-1,3-phenylene)oxy-terephthaloyl]in o-chlorophenol and the like; polyazomethines such as those prepared from 4,4'-diaminobenzanilide and terephthaldehyde, methyl-1,4-phenylenediamine and terephthalaldelyde and the like; polyisocyanides such as poly( -phenyl ethyl isocyanide), poly(n-octyl isocyanide) and the like; polyisocyanates such as poly(n-alkyl isocyanates) as for example poly(n-butyl isocyanate), poly(n-hexyl isocyanate) and the like; lyotropic crystalline polymers with heterocylic units such as poly(1,4-phenylene-2,6-benzobisthiazole)(PBT), poly(1,4-phenylene-2,6-benzobisoxazole) (PBO), poly(1,4-phenylene-1,3,4-oxadiazole), poly(1,4-phenylene-2,6-benzobisimidazole), poly[2,5(6)-benzimidazole] (AB-PBI), poly[2,6-(1,4-phenylene)-4-phenylquinoline], poly[1,1'-(4,4'-biphenylene)-6,6'-bis(4-phenylquinoline)] and the like; polyorganophosphazines such as polyphosphazine, polybisphenoxyphosphazine, poly[bis(2,2,2'trifluoroethyelene) phosphazine]and the like; metal polymers such as those derived by condensation of trans-bis(tri-n-butylphosphine) platinum dichloride with a bisacetylene or trans-bis(tri-n-butylphosphine)bis(1,4-butadienyl)platinum and similar combinations in the presence of cuprous iodine and an amide; cellulose and cellulose derivatives such as esters of cellulose as for example triacetate cellulose, acetate cellulose, acetate-butyrate cellulose, nitrate cellulose, and sulfate cellulose, ethers of cellulose as for example, ethyl ether cellulose, hydroxymethyl ether cellulose, hydroxypropyl ether cellulose, carboxymethyl ether cellulose, ethyl hydroxyethyl ether cellulose, cyanoethylethyl ether cellulose, ether-esters of cellulose as for example acetoxyethyl ether cellulose and benzoyloxypropyl ether cellulose, and urethane cellulose as for example phenyl urethane cellulose; thermotropic liquid crystalline polymers such as celluloses and their derivatives as for example hydroxypropyl cellulose, ethyl cellulose propionoxypropyl cellulose, thermotropic liquid crystalline polymers such as celluloses and their derivatives as for example hydroxypropyl cellulose, ethyl cellulose propionoxypropyl cellulose; thermotropic copolyesters as for example copolymers of 6-hydroxy-2- naphthoic acid and p-hydroxy benzoic acid, copolymers of 6-hydroxy-2-naphthoic acid, terephthalic acid and p-amino phenol, copolymers of 6-hydroxy-2-naphthoic acid, terephthalic acid and hydroquinone, copolymers of 6-hydroxy-2-naphthoic acid, p-hydroxy benzoic acid, hydroquinone and terephthalic acid, copolymers of 2,6-naphthalene dicarboxylic acid, terephthalic acid, isophthalic acid and hydroquinone, copolymers of 2,6-naphthalene dicarboxylic acid and terephthalic acid, copolymers of p-hydroxybenzoic acid, terephthalic acid and 4,4'-dihydoxydiphenyl, copolymers of p-hydroxybenzoic acid, terephthalic acid, isophthalic acid and 4,4'-dihydroxydiphenyl, p-hydroxybenzoic acid, isophthalic acid, hydroquinone and 4,4'-dihydroxybenzophenone, copolymers of phenylterephthalic acid and hydroquinone, copolymers of chlorohydroquinone, terephthalic acid and p-acetoxy cinnamic acid, copolymers of chlorohydroquinone, terephthalic acid and ethylene dioxy-4,4'-dibenzoic acid, copolymers of hydroquinone, methylhydroquinone, p-hydroxybenzoic acid and isophthalic acid, copolymers of (1-phenylethyl)hydroquinone, terephthalic acid and hydroquinone, and copolymers of poly(ethylene terephthalate) and p-hydroxybenzoic acid; and thermotropic polyamides and thermotropic copoly(amide-esters).

Also illustrative of useful organic filaments for use in the fabrication of substrate layer 14 are those composed of extended chain polymers formed by polymerization of α, β-unsaturated monomers of the formula:

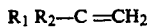

wherein:

$R_1$ and $R_2$ are the same or different and are hydrogen, hydroxy, halogen, alkylcarbonyl, carboxy, alkoxycarbonyl, heterocycle or alkyl or aryl either unsubstituted or substituted with one or more substituents selected from the group consisting of alkoxy, cyano, hydroxy, alkyl and aryl. Illustrative of such polymers of α, β-unsaturated monomers are polymers including polystyrene, polyethylene, polypropylene, poly(1-octadecene), polyisobutylene, poly(1-pentene), poly(2-methylstyrene), poly(4-methylstyrene), poly(1-hexene), poly(1-pentene), poly(4-methoxystrene), poly(5-methyl-1-hexene), poly(4-methylpentene), poly (1-butene), polyvinyl chloride, polybutylene, polyacrylonitrile, poly(methyl pentene-1), poly(vinyl alcohol), poly(vinyl-acetate), poly(vinyl butyral), poly(vinyl chloride), poly(vinylidene chloride), vinyl chloride-vinyl acetate chloride copolymer, poly(vinylidene fluoride), poly(methyl acrylate), poly(methyl methacrylate), poly(methacrylo-nitrile), poly(acrylamide), poly(vinyl fluoride), poly(vinyl formal), poly(3-methyl-1-butene), poly(1-pentene), poly(4-methyl-1-butene), poly(1-pentene), poly(4-methyl-1-pentene, poly-1-hexane), poly(5-methyl-1-hexene), poly(vinyl-cyclopentane), poly(vinylcyclohexane),poly(α-vinyl-naphthalene), poly(vinyl methyl ether), poly(vinyl-ethylether), poly(vinyl propylether), poly(vinyl carbazole), poly(vinyl pyrolidone), poly(2-chlorostyrene), poly(4-chlorostyrene), poly(vinyl formate), poly(vinyl butyl ether), poly(vinyl octyl ether), poly(vinyl methyl ketone), poly(methylisopropenyl ketone), poly(4-phenylstyrene) and the like.

In the most preferred embodiments of the invention, article 10 includes a fibrous substrate layer 14, which may include high molecular weight polyethylene fibers, high molecular weight polypropylene fibers, aramid fibers, high molecular weight polyvinyl alcohol fibers, high molecular weight polyacrylonitrile fibers or mixtures thereof. U.S. Pat. No. 4,457,985 generally discusses such high molecular weight polyethylene and polypropylene fibers, and the disclosure of this patent is hereby incorporated by reference to the extent that it is not inconsistent herewith. In the case of polyethylene, suitable fibers are those of molecular weight of at least 150,000, preferably at least one million and more preferably between two million and five million. Such extended chain polyethylene (ECPE) fibers may be grown in solution as described in U.S. Pat. No. 4,137,394 to Meihuzen et al., or U.S. Pat. No. 4,356,138 of Kavesh et al., issued Oct. 26, 1982, or fibers spun from a solution to form a gel structure, as described in German Off. 3,004,699 and GB 2051667, and especially described in application Ser. No. 572,607 of Kavesh et al., filed Jan. 20, 1984 (see EPA 64,167, published Nov. 10, 1982). As used herein, the term polyethylene shall mean a predominantly linear polyethylene material that may contain minor amounts of chain branching or comonomers not exceeding 5 modifying units per 100 main chain carbon atoms, and that may also contain admixed therewith not more than about 50 wt % of one or more polymeric additives such as alkene-1-polymers, in particular low density polyethylene, polypropylene or polybutylene, copolymers containing mono-olefins as primary monomers, oxidized polyolefins, graft polyolefin copolymers and polyoxymethylenes, or low molecular weight additives such as anti-oxidants, lubricants, ultra-violet screening agents, colorants and the like which are commonly incorporated by reference. Depending upon the formation technique, the draw ratio and temperatures, and other conditions, a variety of properties can be imparted to these fibers. The tenacity of the fibers should be at least 15 grams/denier (as measured by an Instron Testing Machine), preferably at least 20 grams/denier, more preferably at least 25 grams/denier and most preferably at least 30 grams/denier. Similarly, the tensile modulus of the fibers, as measured by an Instron Tensile Testing Machine, is at least 300 grams/denier, preferably at least 500 grams/denier and more preferably at least 1,000 grams/denier and most preferably at least 1,200 grams/denier. These highest values for tensile modulus and tenacity are generally obtainable only by employing solution grown or gel fibers processes.

Similarly, highly oriented polypropylene fibers of molecular weight at least 200,000, preferably at least one million and more preferably at least two million may be used. Such high molecular weight polypropylene may be formed into reasonably well oriented fibers by the techniques prescribed in the various references referred to above, and especially by the technique of U.S. Ser. No. 572,607, filed Jan. 20, 1984, of Kavesh et al. and commonly assigned. Since polypropylene is a much less crystalline material than polyethylene and contains pendant methyl groups, tenacity values achievable with polypropylene are generally substantially lower than the corresponding values for polyethylene. Accordingly, a suitable tenacity is at least 8 grams/denier (as measured by an Instron Tensile Testing Machine), with a preferred tenacity being at least 11 grams/denier. The tensile modulus for polypropylene is at least 160 grams/denier, preferably at least 200 grams/denier. The particularly preferred ranges for the above-described parameters can advantageously provide improved performance in the final article.

High molecular weight polyvinyl alcohol fibers having high tensile modulus are described in U.S. Pat. No. 4,440,711 to Y. Kwon et al., which is hereby incorporated by reference to the extent it is not inconsistent herewith. In the case of polyvinyl alcohol (PV-OH), PV-OH fiber of molecular weight of at least about 200,000. Particularly useful PV-OH fiber should have a tensile modulus of at least about 300 g/d (as measured by an Instron Tensile Testing Machine), a tenacity of at least 7 g/d (preferably at least about 10 g/d, more preferably at about 14 g/d, and most preferably at least about 17 g/d), and an energy-to-break of at least about 8 joules/gram. PV-OH fibers having a weight average molecular weight of at least about 200,000, a tenacity of at least about 10 g/d, a tensile modulus of at least about 300 g/d, and an energy-to-break of about 8 joules/gram are more useful in producing a ballistic resistant article. PV-OH fiber having such properties can be produced, for example, by the process disclosed in U.S. Pat. No. 4,599,267.

In the case of polyacrylonitrile (PAN), PAN fibers of molecular weight of at least about 400,000. Particularly useful PAN fibers should have a tenacity of at least about 10 g/d and an energy-to-break of at least about 8 joules/gram. PAN fibers having a molecular weight of at least about 400,000, a tenacity of at least about 15 to about 20 g/d and an energy-to-break of at least 8 joules/gram is most useful in producing ballistic resistant articles; and such fibers are disclosed, for example, in U.S. Pat. No. 4,535,027.

In the case of aramid fibers, suitable aramid fibers formed principally from aromatic polyamide are described in U.S. Pat. No. 3,671,542, which is hereby incorporated by reference. Preferred aramid fiber will have a tenacity of at least about 20 g/d (as measured by an Instron Tensile Testing Machine), a tensile modulus of at least about 400 g/d (as measured by an Instron Tensile Testing Machine) and energy-to-break at least about 8 joules/gram, and particularly preferred aramid fiber will have a tenacity of at least about 20 g/d, a modulus of at least about 480 g/d and an energy-to-break of at least about 20 joules/gram. Most preferred aramid fibers will have a tenacity of at least about 20 g/denier, a modulus of at least about 900 g/denier and an energy-to-break of at least about 30 joules/gram. For example, poly(phenylene terephthalamide) fibers produced commercially by Dupont Corporation under the trade name of Kevlar ® 29, 49, 129 and 149 having moderately high moduli and tenacity values are particularly useful in forming ballistic resistant composites. Also useful in the practice of this invention is poly(metaphenylene isophthalamide) fibers produced commercially by Dupont under the tradename Nomex ®.

In the case of liquid crystal copolyesters, suitable fibers are disclosed, for example, in U.S. Pat. Nos. 3,975,487; 4,118,372; and 4,161,470, hereby incorporated by reference. Tenacities of about 15 to about 30 g/d (as measured by an Instron Tensile Testing Machine) and preferably about 20 to about 25 g/d, and tensile modulus of about 500 to 1500 g/d (as measured by an Instron Tensile Testing Machine) and preferably about 1000 to about 1200 g/d are particularly desirable.

As depicted in FIGS. 2 to 12 article 10 of this invention includes a plurality of planar bodies 16 affixed to one or more surfaces of one or more of substrate layers 14. As a ballistic missile impacts a planar body 20, the missile can be broken and/or enlarged and flattened to increase its impact area and decrease the velocity of the missile. Means for attaching planar bodies 16 to substrate layer 14 may vary widely and may include any means normally used in the art to provide this function. Illustrative of useful attaching means are adhesives such as those discussed in R. C. Liable, *Ballistic Materials and penetration Mechanics*, Elsevier Scientific Publishing Co. (1980). Illustrative of other useful attaching means are bolts, screws, staples mechanical interlocks, stitching, or a combination of any of these conventional methods. As depicted in FIGS. 2, 5, 6 and 13 in the preferred embodiments of the invention planar bodies 16 are stitched to the surface of layer 14 by way of stitches 22 and eyes 24. Optionally, the stitching may be supplemented by adhesive. As depicted in FIG. 3, 4, 5, and 6 in cross-section, article 10 comprises distinct layers 12a, 12b and 12c, each consisting of a plurality of substrate layers 14, stitched together by horizontal stitches 18 and vertical stitches 20 (not depicted). Layer 12a is the outer layer which is exposed to the environment, and layer 12c is the inner layer closest to the body of the wearer. The two covering layers 12a and 12c sandwich a ballistic layer 12b, which, in the body armor of the figures comprises a plurality of stitched substrate layers 14a' to 14k' (FIG. 4) and 14a' to 14i' (FIG. 3) having a plurality of planar bodies partially covering both outer surfaces of said plurality of layers 14 forming a pattern of covered areas 28 and uncovered areas 30 on the outer surfaces. As shown in FIG. 3, the plurality of planar bodies 26 are positioned on the two surfaces such that the covered areas 28 on one surface are aligned with the uncovered areas 30 on the other surface. In the preferred embodiments of the invention depicted in FIG. 3 and 4, each planar body 16 is uniformly larger than its corresponding uncovered area 30 such that planar bodies 16 adjacent to an uncovered area 30 partially overlap with the corresponding planar body 16 (of the area 30) on the other outer surface of the plurality of layers 14 by some portion 32. The degree of overlap may vary widely, but in general is such that preferably more than about 90 area %, more preferably more than about 95 area % and most preferably more than about 99 area % of the uncovered areas 30 on an outer surface of the plurality of layers 14 are covered by its corresponding planar body 16 on the other outer surface of the plurality of layers 14.

Figure 4:
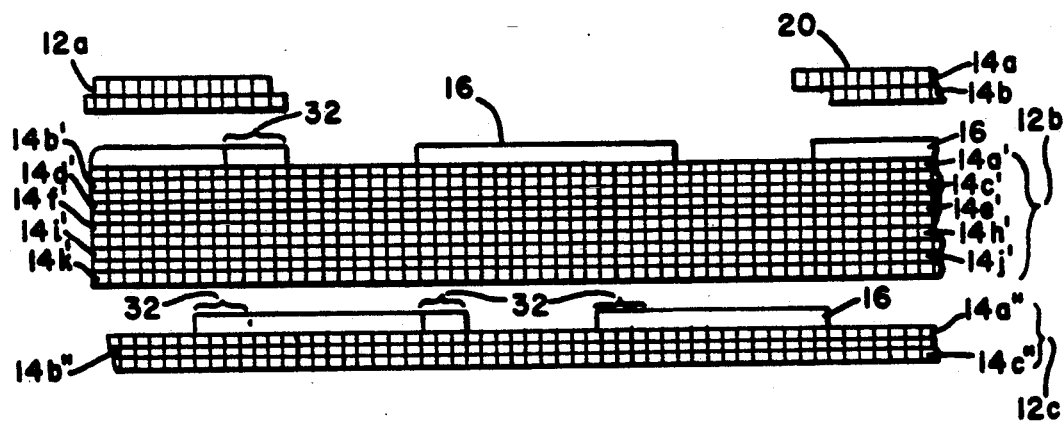
FIG. 4 is an enlarged fragmental sectional view of the body armor of this invention FIG. 2 taken on line 3—3 which includes a plurality of rigid ballistic elements on one side of two fibrous layers.

FIG. 4 depicts a variant of the embodiment of FIG 3 which differs by placing planar bodies 16 on a surface of layer 12b and on a surface of layer 13c. Corresponding parts are referred to by like numerals.

As shown in the Figures, the position of planar bodies 16 can vary widely. For example, planar bodies 16 may be on an outside surface of a fibrous layer 12 or may be encapsulated inside of the plurality of fibrous layers 14 on interior surfaces. As depicted in FIGS. 3 to 7, planar bodies 20 are preferably space filling and will provide more than one, preferably two or three and more preferably three semi-continuous or continuous seams in different directions which preferably intersect at an angle with each other (more preferably at an angle of about 60°) in order to allow flexing in multiple directions.

The number of planar bodies 16 may vary widely, the only requirement is that there is at least one planar body 16 bound to a surface of at least one layer 14. Planar bodies 16 can be affixed using any conventional means as for example bolts, screws, stitches, bolts and the like. In the preferred embodiments of the invention, planar bodies 16 are sewn to at least one surface of each layer 14, and the number and types of planar bodies 16 are such that article 10 has the required flexibility.

The shape of planar bodies 16 and the area percent of layer 14 covered by planar bodies 16 may vary widely. For example, planar bodies 16 may be in the form of a sheet or sheet-like (e.g. contiguous or overlapping ribbons, steps, squares and the like preferably with rounded or truncated edges to minimize damage to substrate layer 14 which form a sheet-like layer) which is bonded to or in contact with 100 percent or substantially one hundred percent of a surface of layer 14. Alternatively, planar bodies 16 may be formed from a plurality of various geometrically shaped planar bodies (e.g. ribbons, hexagons, triangles, rectangles, squares, strips) which cover less than 100% surface of layer 14. In the preferred embodiments of this invention, planar bodies 16 are formed from metal sheets, strips, ribbons and the like and are affixed to a least about 5 area percent of a major surface of substrate layer 14 based on the total area of said surface. In the more preferred embodiments of the invention, planar bodies 16 are affixed to at least about 20 area percent of a major surface of layer 14, and in the most preferred embodiments of the invention, planar bodies 16 are affixed to at least about 50 area percent of a major surface of a fibrous layer 14.

Figure 13:
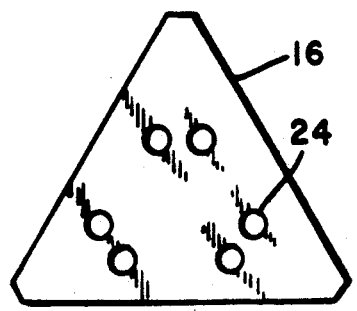
FIG. 13 is a frontal view of a truncated metal body in the shape of an equilateral triangle.
Figure 11:
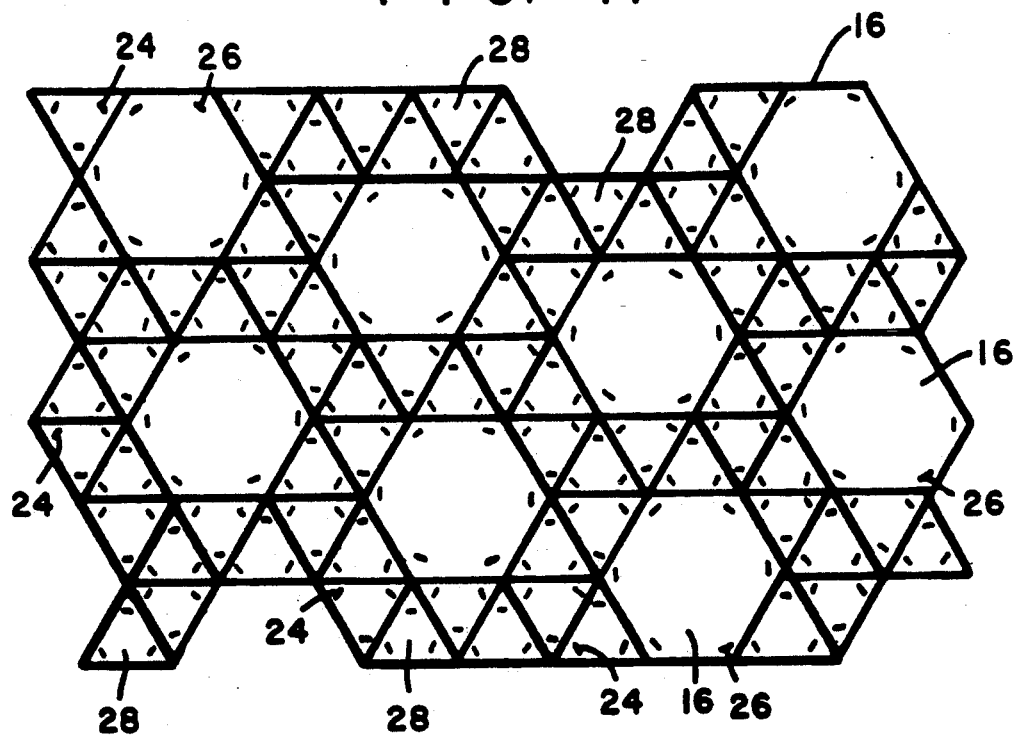
FIG. 11 is an frontal view of an embodiment of this invention having shaped metal panels sewn to a substrate in which the panels are in the shape of equilateral triangles and hexagons.
Figure 12:
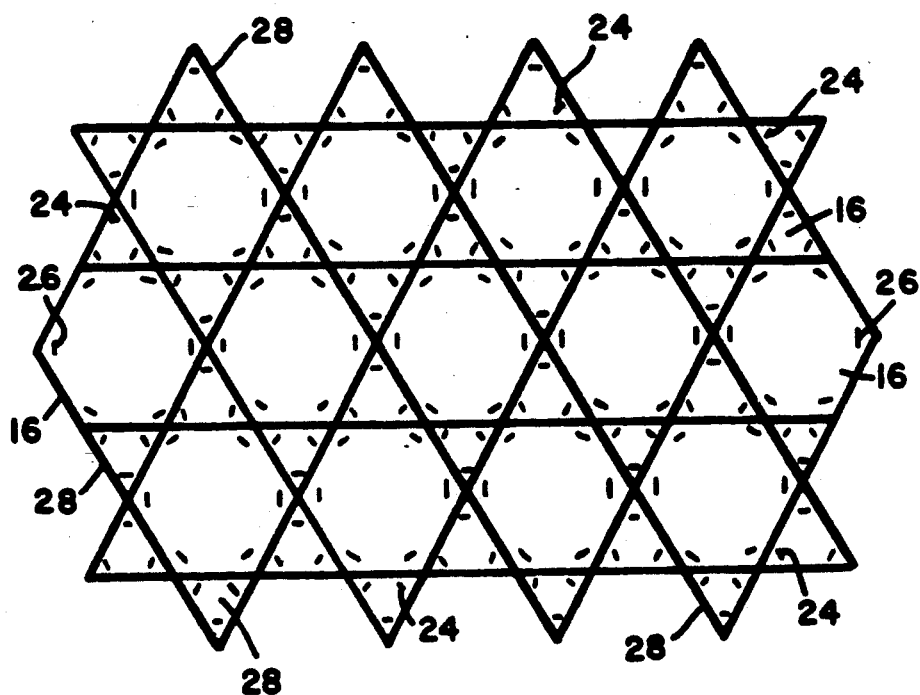
FIG. 12 is a frontal view of another embodiment of this invention having shaped metal panels sewn to a substrate in which the panels are in the shape of equilateral triangles and hexagons.

Affixation of a planar bodies 16 to a substrate layer 14 as continuous sheet may cause stiffening of the structure. Although for certain applications this may be acceptable provided that article 10 has the required degree of flexibility, for many applications where relatively high penetration resistance and flexibility are desired, such as a ballistic resistant vest, it is desirable to affix planar bodies 16 to substrate layer 14 such that the desired flexibility is obtained. As shown in the Figures, this is preferably accomplished by affixing planar bodies 16 as discontinuous geometric shapes. In these applications, it is preferred that the planar bodies 16 include highly penetration resistance structures formed from rigid ballistic resistant materials. Preferred geometric shapes will be space filling and will provide more than one (preferably at least two, more preferably three and most preferably three) different directions for continuous or semi continuous (preferably continuous) seams where seam directions are preferably at an angle to each other (more preferably at an angle of about 60°) in order to allow flexing in multiple directions as depicted in FIGS. 5 to 22. Such constructions regardless of the thickness and rigidity of planar body 16 can drape around doubly curved surfaces and thus exhibit the desired flexibility. (See FIGS. 7 to 10). Primarily because of the improved flexibility a preferred construction consists of an arrangement of triangular shaped bodies (preferably right angle triangles, equilateral triangles or a combination thereof and more preferably equilateral triangles) which are arranged to be space filling as depicted in FIGS. 6 to 12. A desirable modification to this construction is the inclusion of compatible geometric shapes such as hexagons, parallelograms, trapezoids and the like, which correspond to shapes obtainable by fusion of two or more triangles at appropriate edges. As depicted in FIGS. 11 and 12, the most compatible geometric shape is a hexagon. It should be noted that while in FIGS. 11 and 12 the hexagonal and triangular shaped bodies are positioned on the same surface of layer 14, such positioning is not critical, and such bodies can be conveniently placed on more than one surface as for example in FIGS. 3 to 10. Such space filling constructions allow a wide range of compromises between flexibility and minimization of seams and penitration resistance. As depicted in FIG. 13 one or more of the apexes of planar bodies 16 are preferably truncated or rounded which also enhances flexibility by allowing substrate layer 14 to flex away from body 16 between the attachment point and the perimeter. Planar bodies 16 preferably include eyes 24 for stitching planar bodies 20 to a surface of layer 14 by way of stitches 26. Additional flexibility can be achieved by providing spacers between substrate layer 14 and planar bodies 16. In these preferred embodiments, curvilinear planar bodies 18 such as a circular or oval shaped body 16 (not depicted) are positioned at the truncated or rounded apexes to provide for additional penetration resistance. Alternatively, a mixture of totally or partially truncated planar bodies 16 and partially truncated or untruncated planar bodies 16 can be used in which the open areas at the truncated ends can be covered by the un-truncated ends of the adjacent partially truncated or untruncated planar body 16. Such space filling constructions allow a wide range of compromises between flexibility and minimization of seams, and maximization of penetration resistance.

An alternative to discontinuous geometric shapes is the use of relatively rigid penetration resistant planar bodies 16 containing slits, creases, preforations and the like which allow planar bodies 16 to flex along the slits, perforations, creases and the like. The use of slits, perforations and the like can provide for enhanced ballistic protection while at the same time not affecting the flexibility of the ballistic article to a significant extent. It is desirable that slits, perforations and the like be aligned so that there are two or three, or three directions along which planar bodies 16 can easily flex, in an analogous manner to that described previously for the individual geometric shapes.

Figure 5:
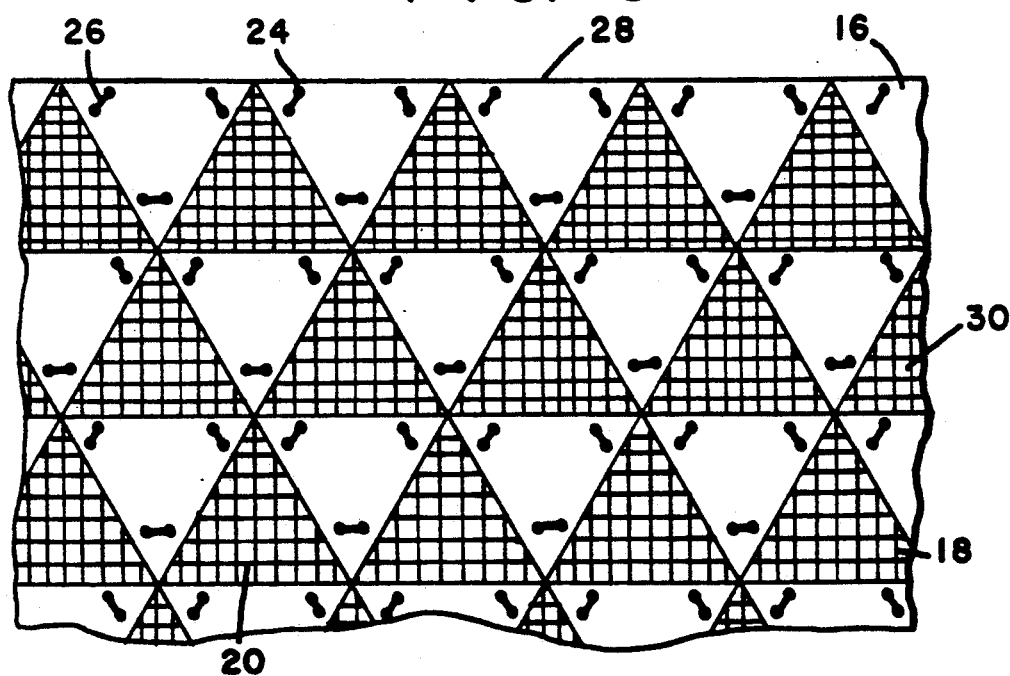
FIG. 5 is a fragmentary frontal view of the body armor of this invention of FIG. 2 in which certain selected layers have been cut away to depict equilateral triangular shaped rigid panels laminated and sewn on both sides of a stitched fabric.
Figure 6:
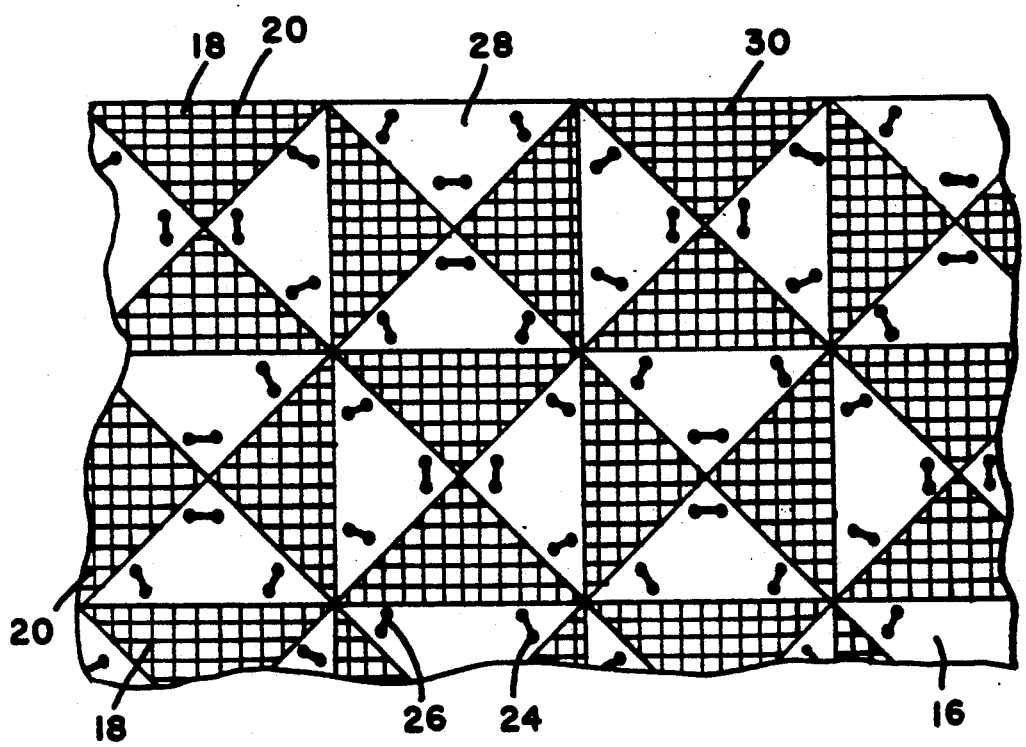
FIG. 6 is a fragmentary frontal view of the body armor of this invention of FIG. 3 in which certain selected layers have been cut away to depict of right angle triangular shaped rigid panels laminated and sewn on both sides of a stitched fabric.

As shown in FIG. 3, 4 and 5 in the preferred embodiments of this invention, article 10 includes a plurality of layers 14 in which rigid substantially planar bodies 16 in adjacent layers 14 are offset to provide for continous and overlapping rigid ballistic protection.

Figure 10:
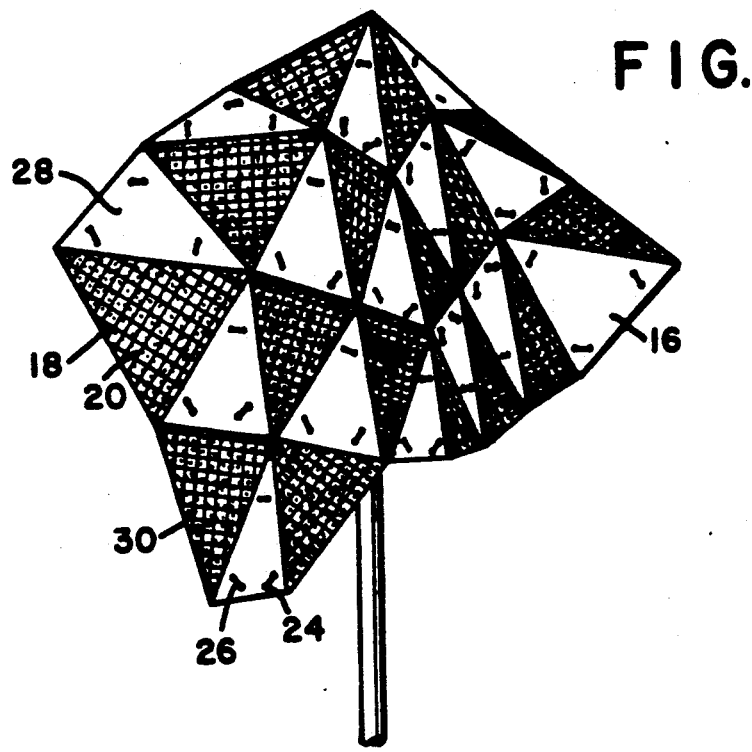
FIG. 10 is a sideview of the construction depicted in FIG. 5 where the viewing direction is 90° from that of FIG. 9

In these embodiments, as shown in FIGS. 4 to 10 article 10 preferably includes at least two layers 14 in which each layer 14 is partially covered with planar bodies 16, preferably forming an alternating pattern of covered areas 28 and uncovered areas 30. These layers are positioned in article 18 such that uncovered areas 30 of one layer 14 are aligned with covered areas 28 of another layer 14 (preferably an adjacent layer) providing for partial or complete coverage of the uncovered areas of one layer 14 by the covered areas of an another layer 14. Alternatively, another preferred embodiment as depicted in FIGS. 3, 5 and 10 includes a layer 14 in which each side of the layer is partially covered with bodies 16 and where the bodies are positioned such that the covered areas 28 on one side of the layer are aligned with the uncovered areas 30 on the other side of the layer. In the preferred embodiments of the invention, the surface of layer 14 is covered with planar bodies 20 such that the bodies are uniformly larger than the uncovered mated surface of the other layers 12 or the other surface of the same layer providing for complete overlap. This is preferably accomplished by truncation of the edges of the bodies 20 or otherwise modification of such edges to allow for closer placement of bodies 16 on the surface such that a covered area is larger than the complimentary uncovered area 30. Extensive disalignment between the various fibrous layers 14, is prevented by the securing means 18 and 20.

Planar bodies 16 are comprised of a metallic ballistic material which may vary widely depending on the uses of article 10, and offers additional ballistic protection. Useful materials for fabrication of planar bodies 16 include metals such as nickel, manganese, tungsten, magnesium, titanium, aluminum and steel plate. Illustrative of useful steels are carbon steels which include mild steels of grades AISI 1005 to AISI 1030, medium-carbon steels of grades AISI 1030 to AISI 1055, high-carbon steels of the grades AISI 1060 to AISI 1095, free-machining steels, low-temperature carbon steels, rail steel, and superplastic steels; high-speed steels such as tungsten steels, molybdenum steels, chromium steels, vanadium steels, and cobalt steels; hot-die steels; low-alloy steels; low-exapnsion alloys; mold-steel; nitriding steels for example those composed of low-and medium-carbon steels in combination with chromium and aluminum, or nickel, chromium and aluminum; silicon steel such as transformer steel and silicon-manganese steel; ultrahigh-strength steels such as medium-carbon low alloy steels, chromium-molybdenum steel, chromium-nickel-molybdenum steel, iron-chromium-molybdenum-cobalt steel, quenched-and-tempered steels, cold-worked high-carbon steel; and stainless steels such as iron-chromium alloys austenitic steels, and chromium-nickel austenitic stainless steels, and chromium-manganese steel. Useful materials also include alloys such a manganese alloys, such as manganes aluminum alloy, manganese bronze alloy; nickel alloys such as, nickel bronze, nickel cast iron alloy nickel-chromium alloys, nickel-chromium steel alloys, nickel copper alloys, nickel-molybdenum iron alloys, nickel-molybdenum steel alloys, nickel-silver alloys, nickel-steel alloys; iron-chromium-molybdenum-cobalt-steel alloys; magnesium alloys; aluminum alloys such as those of aluminum alloy 1000 series of commercially pure aluminum, aluminum-manganese alloys of aluminum alloy 300 series, aluminum-magnesium-manganese alloys, aluminum-magnesium alloys, aluminum-copper alloys, aluminum-silicon-magnesium alloys of 6000 series, aluminum-copper 0-chromium of 7000 series, aluminum casting alloys; aluminum brass alloys and aluminum bronze alloys.

Figure 7:
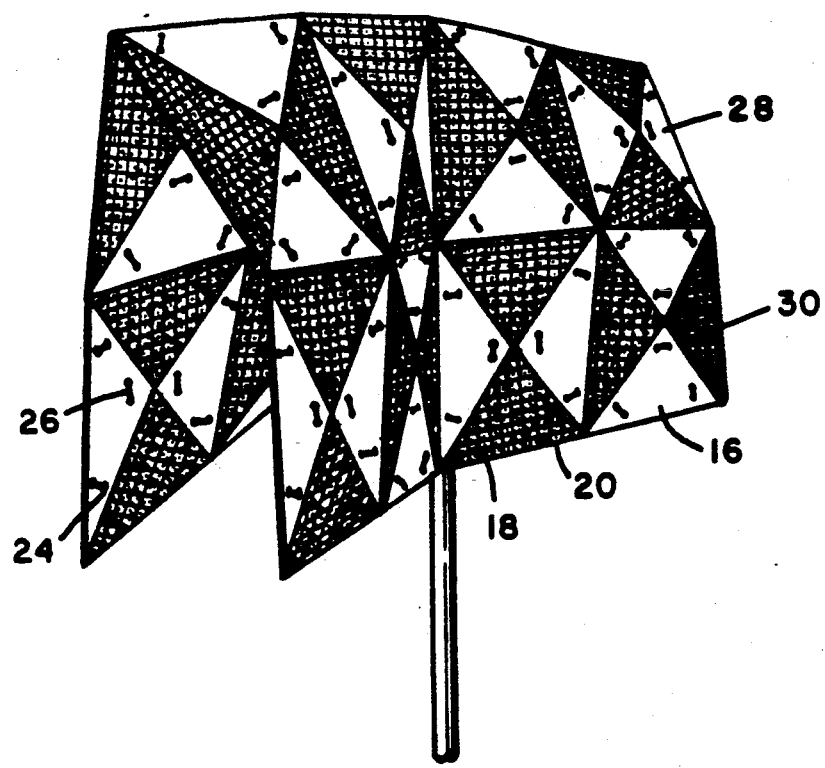
FIG. 7 is a sideview of the construction depicted in FIG. 6.
Figure 8:
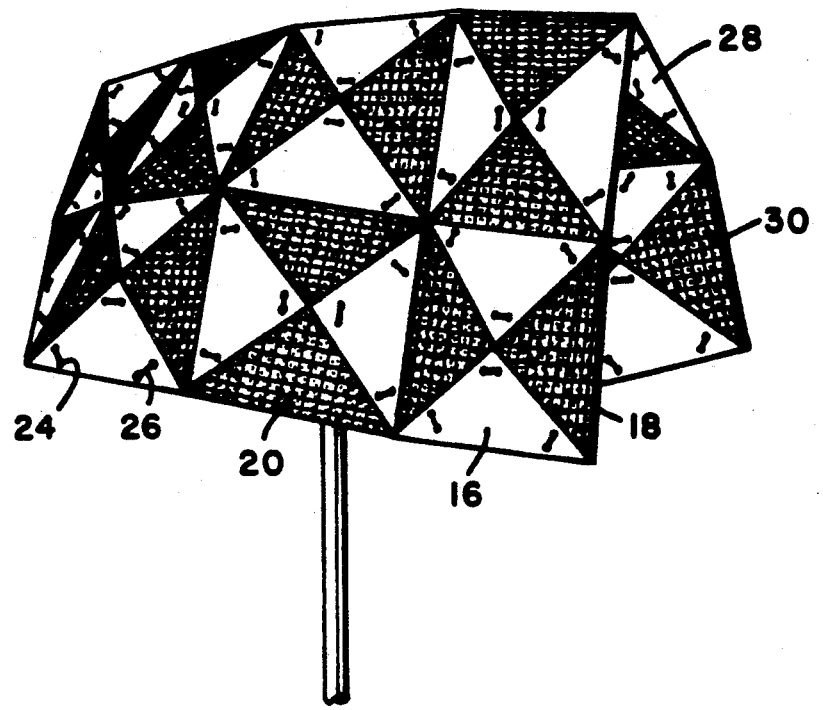
FIG. 8 is a sideview of the construction depicted in FIG. 6, where the viewing direction is 90° from that of FIG. 7.
Figure 9:
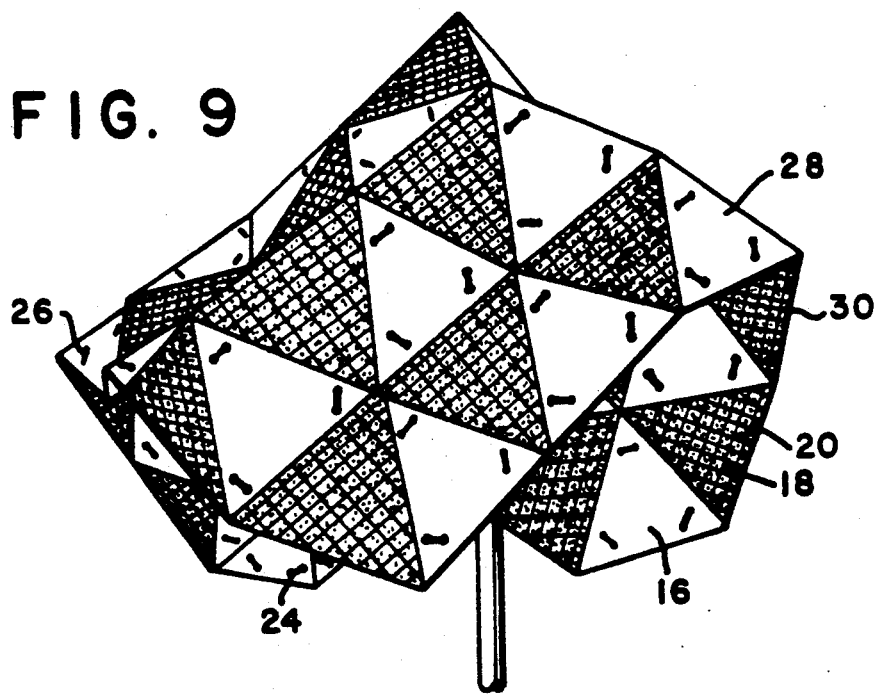
FIG. 9 is a sideview of the construction depicted in FIG. 5.

The shape of planar bodies 16 may vary widely. For example, planar bodies 16 may be of regular shapes such as hexagonal, triangular, square, octagonal, trapizoidal, parallelogram and the like, or may be irregular shaped bodies of any shape or form. In the preferred embodiments of this invention, planar bodies 16 are regular shaped bodies, irregularly shaped bodies or combination thereof which completely of substantially completely (at least 90% area) cover the surface of fibrous layer 14. In the more preferred embodiments of the invention, planar bodies 16 are of regular shape (preferably having truncated edges), and in the most preferred embodiments of the invention planar bodies 16 are triangular shaped bodies (preferably right angle triangles, equilateral triangles or a combination thereof and more preferably equilateral triangles) as depicted in FIGS. 4 and 7, or a combination of triangular shaped bodies and hexagon shaped bodies as depicted in FIGS. 11 and 12, which provide for relative improved flexibility relative to ballistic articles having planar bodies 16 of other shapes of equal area.

The number of layers 12 included in article 10 of this invention may vary widely depending on the used of the composite, for example, for those uses where article 10 would be used as ballistic protection, the number of layers 12 would depend on a number of factors including the degree of ballistic protection desired and other factors known to those of skill in the ballistic protection art. In general for this application, the greater the degree of protection desired the greater the number of layers 12 included in article 10 for a given weight of the article Conversely, the lesser the degree of ballistic protection required, the lesser the number of layers 12 required for a given weight of article 10.

As depicted in the Figure, article 10 preferably includes at least two layers 14 in which each layer 14 is partially covered with planar bodies 18, preferably forming an alternating pattern of covered areas 28 and uncovered areas 30. These layers are positioned in article 10 such that uncovered areas 30 of one layer 14 are aligned with covered areas 28 of another layer 14 (preferably an adjacent layer) providing for partial or complete coverage of uncovered areas 30 of one layer 14 by covered areas 28 of another layer 12 and vice versa. Alternatively, another preferred embodiment includes a layer 14 in which each side of the layer is partially covered with bodies 18 where the bodies are positioned such that covered areas 28 on one side of layer 14 are aligned with uncovered areas 30 on the other side of layer 14. In the preferred embodiments of the invention the surface of layer 14 covered with planar body 16 such that the bodies are uniformly larger than uncovered mated areas 30 of the other layer 14 providing for complete overlap. This is preferably accomplished by truncation of the edges of the bodies 18 or otherwise modification of such edges to allow for close placement of the bodies on the surface such that a covered area is larger than the complimentary uncovered area.

The articles of this invention may be fabricated through use of conventional techniques. For example, bodies 16 may be sewn to layer 12 using conventional sewing techniques, preferably at one or more points of body 16, more preferably a distance from the edge of a body 16 as depictd in FIGS. 4, 5 and 12. By sewing a distance from the edge of body 16 flexibility is enhanced. To prevent extensive disalignment between various layers 12 adjacent layers can be stitched together.

The thread used to stitch bodies 16 to substrate layers 14 can vary widely, but is preferably a relatively high modulus (equal to or greater than about 200 grams/denier) and a relatively high tenacity (equal to or greater than about 15 grams/denier) fiber. All tensile properties are evaluated by pulling a 10 in. (25.4 cm) fiber length clamped in barrel clamps at 10 in/min (25.4 cm/min) on an Instron Tensile Tester. In the preferred embodiments of the invention, the modulus of the fiber is from about 400 to about 3000 grams/denier and the tenacity is from about 20 to about 50 grams/denier, more preferably the modulus is from about 1000 to about 3000 grams/denier and the tenacity is from about 25 to about 50 grams/denier; and most preferably the modulus is from about 1500 to 3000 grams/denier and the tenacity is from about 30 to about 50 grams/denier. Useful threads and fibers may vary widely and include those described herein below in the discussion of fiber for use in the fabrication of substrate layers 12. However, the thread or fiber used in stitching means is preferably an aramid fiber or thread (as for example Kevlar ® 29, 49, 129 and 141 aramid fiber), an extended chain polyethylene thread or fiber (as for example Spectra ® 900 fiber and Spectra ® 1000 polyethylene fiber) or a mixture thereof.

The composites of this invention can be used for conventional purposes. For example, such composites can be used in the fabrication of penetration resistance articles and the like using conventional methods. For example, such penetration resistant articles include meat cutter aprons, protective gloves, boots, tents, fishing gear and the like.

The articles are particularly useful as a "bulletproof" vest material or ballistic resistant articles such as "bulletproof" lining for example, or a raincoat because of the flexibility of the article and its enhanced ballistic resistance.

In ballistic studies, the specific weight of the shells and plates can be expressed in terms of the areal density (ADT). This areal density corresponds to the weight per unit area of the ballistic resistant armor. In the case of filament reinforced composites, the ballistic resistance of which depends mostly on filaments, another useful weight characteristic is the filament areal density of the composite. This term corresponds to the weight of the filament reinforcement per unit area of the composite (AD).

The following examples are presented to provide a more complete understanding of the invention and are not to be construed as limitations thereon.

EXAMPLE 1

Truncated equilateral triangular shaped aluminum pieces, shown in FIG. 13 and 14, were sewn onto the front and back of five ballistic nylon fabric layers using the arrangement shown in FIG. 4 (triangular grid segments had side length of 38 mm, identical to that of the aluminum triangles before truncation. The aluminum equilateral triangles had sides 38 mm long before truncation of the tips. After truncation of tips sides were 32 mm long. Three sets of holes, 2 mm in diameter, were drilled through the aluminum triangles as shown in FIGS. 3 and 14. The areal density of the aluminum plate was 3.5 kg/m² and of the individual layers of the ballistic nylon fabric was 0.27 kg/m². These panels were then sewn into slightly larger nylon fabric panels, with one of the layers of the larger nylon panels on the impact side and five of the larger panels on the body side.

The completed panels were sewn into the outer shell in an identical manner to that of a standard Kevlar ® fabric vest.

The portion of the completed panels containing aluminum triangles were 6.5 kg/m², consisting of 3.5 kg/m² of aluminum and 3.0 kg/m of fabric.

X-ray radiography, carried out on the large back panel of the vest, indicated less than 32 of the area was devoid of metal coverage.

EXAMPLE 2

The experimental vest of Example 1, weighing 3500 g, was compared to a standard Kevlar ® fabric vest of the same size, weighing 3900 g, and judged by each of ten wearers to be significantly more flexible and comfortable than the standard Kevlar ® fabric vest in spite of the fact that the experimental vest provided almost complete coverage by rigid panels for the portions of the body covered by the vest.

EXAMPLE 3

A series of the tests was carried out to compare the penetration resistance of the experimental vest of Examples 1 and 2 with a standard Kevlar ® fabric vest. In these experiments, the standard Kevlar ® fabric vest was placed on a cylindrical support 30 cm in diameter with the support centered on the large back panel. A standard dart ( as used with the dart board—dart wt. =14 g, shaft length=3.3 cm and largest diameter of tapered shaft=2 mm) was dropped from the height of 18 ft. (5.5 m) and the dart point penetrated the vest. The test was repeated using the experimental vest of Example 1, containing the aluminum triangles and no penetration occurred.

EXAMPLE 4

A series of flexible structures were prepared by sewing aluminum plates (0.050 inches thick) (1.3 mm), between two SPECTRA ® fabric layers (SPECTRA ® 1000 yarn, 650 denier, plain weave, 34×34 yarns/in. yarns/cm). A comparison of a number of different constructions is given below:

A. Hexagonal plates (Side length 1.5 in. (3.8 cm))

This construction had limited flexibility and cannot be crumpled in the same manner as paper.

B. Right Angle Triangles 90°/45°/4° (hypotenuse 3 in. (7.6 cm))

This construction was much more flexible than construction A and can be crumpled in an analogous manner to paper.

C. Equilateral Triangles (Side length 2.3 in. (5.8 cm))

This construction was more flexible than construction B. The triangle area of these two constructions were almost identical.

D. Equilateral Triangles (Side length 1.5 in. (3.8 cm))

This was the most flexible construction of the series tested.

EXAMPLE 5

Aluminum plates, identical to those used in example 1, were cut into equilateral triangles having side length of 6 cm and a pair of holes drilled approximately 1.5 cm in from each apex. Each apex was then truncated by cutting 2 mm from it, with the cut being parallel to the opposite side. These triangles were than sewn onto a 30 cm square fabric target consisting of 10 layers of ballistic nylon. These layers were sewn around the perimeter by a set of parallel seams 5.5 cm apart, parallel to one set target sides. The triangles were sewn to the fabric target using the three pairs of holes according to the arrangement shown in FIG. 4. All triangles in the A position were on one side of the target and all triangles in B position were on the other side of the target.

The resulting target could be easily flexed in multiple directions and was not significantly stiffer than the fabric target without attached metal triangles.

EXAMPLE

A panel 14"×14" (35 cm×35 cm) panel was constructed, consisting of a SPECTRA ® fabric layer with truncated metal triangles arranged on both sides of the fabric. One half of the fabric layer was covered with truncated triangles as by sewing them to the fabric by the three sets of holes shown in FIG. 13. The other half of the fabric layer utilized truncated triangles sewn to the fabric using only two sets of holes. (Hole diameters were 0.05 in. (1.27 mm)). The two rectangular sections were separated by a strip 1.4 inches (3.6 cm) wide.

This modified fabric layer used to form the impact side of the assembled panel. Two fabric layers were placed behind the impact panel and 0.05" (0.127 cm) thick titanium buttons which were 0.5" (1.27 cm) in diameter were sewn onto the side of the layers opposite the impact panel, at the junction of the triangular apexes in a selected area. The buttons were sewn onto all three fabric layers. Nine fabric layers were placed behind this assembly and the entire construction was sewn around the perimeter.

The areal density of the 12 SPECTRA ® fabric layers is 1.4 kg/m, and of the 0.05" (0.127 cm) titanium plate is 5.75 kg/m$^2$.

X-ray radiography was carried out to illustrate the extent of areal coverage which indicated that overlap occurs on the sides of all triangles and that the titanium buttons cover the small areas of vulnerability.

All portions of the panel were flexible, although some reduction in flexibility was noted in the area containing the titanium buttons.

What is claimed is:

1. A flexible ballistic resistant article comprising one or more composite layers each of which comprises a flexible substrate layer having a plurality of planar metallic bodies on a surface thereof, said bodies shaped and positioned such that said article has one or more first semi-continuous or continuous seams, one or more second semi-continuous or continuous seams and one or more third semi-continuous or continuous seams in which the directions of said first, second and third seams are such that said seams intersect at an angle whereby said article is capable of flexing along said seams.

2. An article as recited in claim 1 which comprises a first and second composite layers, each of which comprises a flexible substrate layer having a surface which is partially covered by a plurality of planar metallic bodies forming a pattern of covered and uncovered areas, said first and second composite layers positioned such that the uncovered areas of the surface of one layer are in correspondence and alignment with the covered areas of the surface of the other layer.

3. An article as recited in claim 2 wherein said first and second layers are adjacent.

4. An article as recited in claim 2 wherein the uncovered areas of the surface of a layer are uniformly smaller than the corresponding covered areas of the other layer.

5. An article as recited in claim 1 which comprises a plurality of first seams, a plurality of second seams and a plurality of third seams.

6. An article as recited in claim 5 wherein said planar bodies have regular shapes.

7. An article as recited in claim 6 wherein said substrate layer is a fibrous layer comprising a network of fibers.

8. An article as recited in claim 6 wherein said seams are continuous.

9. An article as recited in claim 8 wherein seam directions are at an angle of about 60° with respect to each other.

10. An article as recited in claim 2 wherein said metallic bodies are of an triangular shape, or is a combination of trapezoidal, parallelogram shaped or hexagonal and triangular shaped bodies.

11. An article as recited in claim 10 wherein said triangular shaped bodies have internal angles equal to about 60° ±5°.

12. An article as recited in claim 4 wherein said substrate layer is a fibrous layer comprising a network of high strength fibers having a tensile strength of at least about 7 grams/denier, a tensile modulus of at least about 150 grams/denier and an energy-to-break of at lease about 30 joules/grams.

13. An article as recited in claim 12, wherein the filaments have a tenacity equal to or greater than about 10 g/d, a tensile modulus equal to or greater than about 150 g/d and an energy-to-break equal to or greater than about 10 j/g.

14. An article as recited in claim 13, wherein said tenacity is equal to or greater than about 20 g/d, said modulus is equal to or greater than about 500 g/d, and said energy-to-break is equal to or greater than about 15 j/g.

15. An article as recited in claim 14 wherein said tenacity is equal to or greater than about 25 g/d, said modulus is equal to or greater than about 1000 g/d, and said energy-to-break is equal to or greater than about 20 j/g.

16. An article as recited in claim 15 wherein said tenacity is equal to or greater than about 30 g/d, said modulus is equal to or greater than about 1300 g/d, and said energy-to-break is equal to or greater than about 30 j/g.

17. An article as recited in claim 4 wherein said substrate layer comprises at least one sheet-like fibers array in which said fibers are arranged substantially parallel to one another along a common fiber direction.

18. An article as recited in claim 17 wherein said substrate layer comprises more than one array, with adjacent arrays aligned at an angle of from about 1° to about 179° with respect to the common fiber direction of the parallel fibers contained in said adjacent array.

19. An article as recited in claim 18 wherein said angle is from about 45° to about 90°.

20. An article as recited in claim 19 wherein said angle is about 90°.

21. An article as recited in claim 10 wherein said substrate layer comprises a non-woven fabric or a woven fabric.

22. An article as recited in claim 19 wherein said substrate layer comprises a woven fabric.

23. An article as recited in claim 4 wherein said substrate layer comprises fibrous network in a polymer matrix.

24. An article as recited in claim 21 wherein said fibrous network comprises a sheet-like fiber array in which said fibers are arranged substantially parallel to one another along a common fibers direction.

25. An article as recited in claim 24 wherein said network comprises a plurality of sheet-like fiber arrays in which adjacent arrays are aligned at an angle of from about 1° to about 179° with respect to the longitudinal axis of the parallel fibers contained in said adjacent arrays.

26. An article as recited in claim 23 wherein said angle is from about 45° to about 90°.

27. An article as recited in claim 24 wherein said angle is about 90°.

28. An article as recited in claim 15, 19 or 21 wherein said fibers are polyethylene fibers, glass fibers, aramid fibers, nylon fibers or mixtures thereof.

29. An article as recited in claim 28 wherein said fibers are polyethylene fibers.

30. An article as recited in claim 28 wherein said fibers are aramid fibers.

31. An article as recited in claim 28 wherein said fibers are a combination of polyethylene fibers and aramid fibers.

32. An article as recited in claim 4 wherein all or a portion of the apexes of said planar bodies are truncated.

33. An article as recited in claim 4 wherein the point or points of affixation are spaced from the boundary of said bodies.

34. An article as recited in claim 4 herein said bodies are sewn to said substrate layer.

35. An article as recited in claim 10 wherein said triangular shaped bodies selected from the group of such bodies having interior angles equal to 60° ±5° and 90° ±5° and combinations thereof.

36. An article as recited in claim 10 wherein said triangular shaped bodies are of equilateral shape.

37. An article as recited in claim 10 wherein said triangular shaped bodies are in the shape of right angle triangles, equilateral triangles or combinations thereof.

* * * * *

UNITED STATES PATENT AND TRADEMARK OFFICE
CERTIFICATE OF CORRECTION

PATENT NO.  : 5,187,023
DATED       : February 16, 1993
INVENTOR(S) : Prevorsek et al.

It is certified that error appears in the above-identified patent and that said Letters Patent is hereby corrected as shown below:

Col. 22 line 4, "herein" should read --wherein--

Signed and Sealed this

Twenty-ninth Day of March, 1994

Attest:

BRUCE LEHMAN

Attesting Officer

Commissioner of Patents and Trademarks